US00RE44386E

(19) United States
(12) Reissued Patent
Tanner

(10) Patent Number: US RE44,386 E
(45) Date of Reissued Patent: Jul. 23, 2013

(54) BINARY EXPLODING TARGET, PACKAGE PROCESS AND PRODUCT

(76) Inventor: Daniel Jeremy Tanner, Pleasant Hill, OR (US)

(21) Appl. No.: 11/206,283

(22) Filed: Aug. 16, 2005

Related U.S. Patent Documents

Reissue of:

(64) Patent No.: 6,848,366
Issued: Feb. 1, 2005
Appl. No.: 10/274,464
Filed: Oct. 17, 2002

U.S. Applications:

(63) Continuation-in-part of application No. 09/872,187, filed on Aug. 20, 2001, now abandoned.

(51) Int. Cl.
*D03D 23/00* (2006.01)

(52) U.S. Cl.
USPC ..... 149/109.6; 102/335

(58) Field of Classification Search
USPC ..... 149/109.6; 102/335
See application file for complete search history.

(56) References Cited

U.S. PATENT DOCUMENTS

| | | | | |
|---|---|---|---|---|
| 3,255,281 | A * | 6/1966 | Alexander, Jr. | 264/3.1 |
| 3,259,532 | A | 7/1966 | Gray | |
| 3,441,455 | A * | 4/1969 | Shock et al. | 149/8 |
| 4,042,431 | A * | 8/1977 | Friant et al. | 149/36 |
| 4,920,852 | A * | 5/1990 | Miller | 86/1.1 |
| 4,944,815 | A | 7/1990 | Consaga | |
| 5,922,986 | A | 7/1999 | Wanninger et al. | |
| 6,016,754 | A * | 1/2000 | Enlow et al. | 102/516 |
| 6,405,627 | B1 * | 6/2002 | Anderson | 89/1.13 |

* cited by examiner

*Primary Examiner* — Aileen B Felton
(74) *Attorney, Agent, or Firm* — Birch, Stewart, Kolasch & Birch, LLP

(57) ABSTRACT

A binary exploding target package, a process of forming an exploding target from the contents of the binary exploding target package, and the exploding target formed therefrom. The binary exploding target package includes a first, target container and a second container. An oxidizer composition is contained within one of the containers and a catalyst composition is contained within the other container. An exploding target is formed by mixing the oxidizer and catalyst compositions, and introducing the mixture into the target container to form an exploding target just prior to using the exploding target as a target for a shooting exercise.

27 Claims, 1 Drawing Sheet

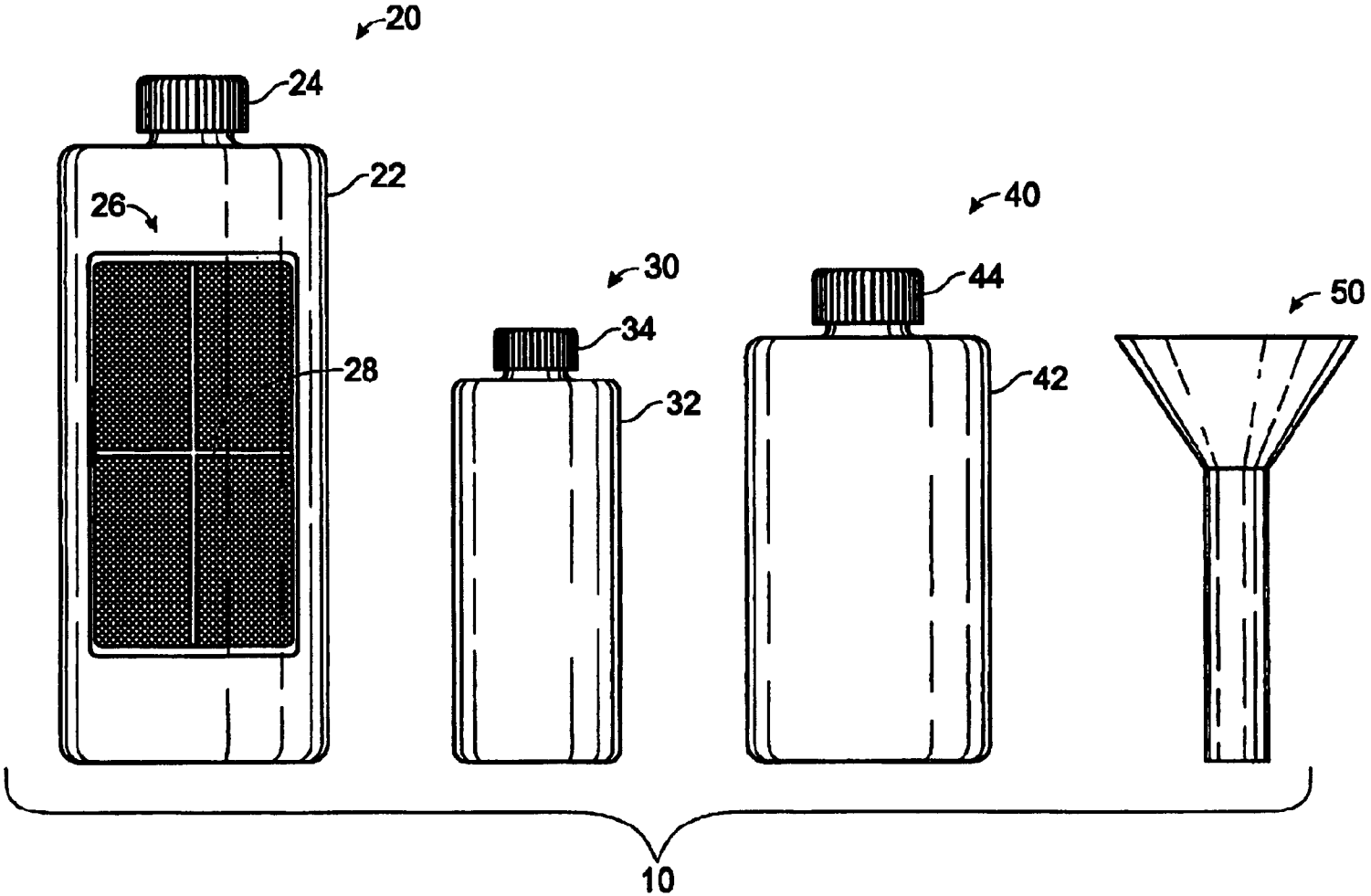
20
24
22
26
28
30
34
32
40
44
42
50
10

BINARY EXPLODING TARGET, PACKAGE PROCESS AND PRODUCT

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of application Ser. No. 09/872,187 filed Aug. 20, 2001 *now abandoned*.

BACKGROUND OF THE INVENTION

The present invention relates to a binary exploding target package, a process of forming an exploding target from the contents of the binary exploding target package, and the exploding target product formed therefrom.

In the past, several companies have offered for sale small exploding targets for use in target practice, training, long range competition, etc. Such exploding targets come with all of the explosive ingredients already mixed, and are classified by federal regulations as a hazardous material and as an explosive. In use, such exploding targets are difficult to be heard over the sound of the muzzle blast from a high powered rifle.

SUMMARY OF THE INVENTION

It is an object of the present invention to provide a binary exploding target package that is safe and legal to ship and store.

It is a further object of the present invention to produce an exploding target from the binary exploding target package that produces a very loud sound upon detonation by a round fired from a center fire rifle.

It is a still further object of the present invention to provide a process of making an exploding target product from the binary exploding target package.

The binary exploding target package of the present invention includes a first, target container and a second container. An oxidizer composition is contained within one of the containers and a catalyst composition is contained within the other container.

An exploding target is formed by mixing the oxidizer and catalyst compositions, and introducing the mixture into the target container to form an exploding target just prior to using the exploding target as a target for a shooting exercise.

BRIEF DESCRIPTION OF THE DRAWINGS

FIG. 1 is a front elevation view of the contents of the binary exploding target package of the present invention.

DESCRIPTION OF PREFERRED EMBODIMENTS

The present invention relates to a binary exploding target package, a process of forming an exploding target from the contents of the binary exploding target package, and the exploding target formed therefrom. The exploding target is for use as a target for target practice, training, competitive shooting, etc. (all hereinafter intended to be included within the phrase "shooting exercise").

In FIG. 1 the contents of the binary exploding target package 10 of the present invention are illustrated. The package 10 includes a first, target container 20 and its contents, a second container 30 and its contents, an empty mixing container 40 and a funnel 50. The target container 20, the second container 30, the mixing container 40 and the funnel 50 are all made of a non-spark generating plastic material, such as polyethylene.

Target container 20 is comprised of a target bottle 22 having a sealing cap 24 removably attached thereto, such as a screw cap. A target area 26 is fixed on the outer surface of target container 20, such as by being printed or embossed onto container 22, or applied thereto as a label.

Preferably target area 26 is a fluorescent orange label having a cross 28 printed thereon. However, any suitable target may be printed on label, such as a bull's-eye, "X", etc.

It is preferred to make the target bottle 22 of a material which shatters into very small pieces of a non-injurious size upon detonation in order to minimize or eliminate the formation of dangerous shrapnel. A suitable such material is polyethylene.

Second container 30 includes a bottle 32 having a sealing cap 34 removably attached thereto, such as a screw cap. It is preferred to make bottle 32 of polyethylene.

Preferably, the first, target container 20 contains the oxidizer composition and the second container 30 contains the "catalyst" composition. This is because the oxidizer composition is larger in volume than the catalyst composition, and it is desirable that the target container be the larger of the two containers. However, it is possible that the contents could be reversed, i.e., that the oxidizer composition would be placed into second container 30 and the catalyst composition placed into the first, target container 20.

The preferred oxidizer composition is ammonium nitrate or, preferably, a mixture of ammonium nitrate and ammonium perchlorate, with ammonium nitrate being present in an amount between about 50% and 100% by weight and ammonium perchlorate being present in an amount between 0% and about 50% by weight. An especially preferred oxidizer composition is one which contains about 85% by weight ammonium nitrate powder having a particle size of about 200 mesh, and about 15% by weight ammonium perchlorate.

Although ammonium nitrate is not required to be present in the oxidizer composition of the present invention, its presence has been found to raise the detonation success rate from about 92% to substantially 100%.

In forming the oxidizer composition, ammonium perchlorate is added to ammonium nitrate and the two materials mixed together to form a substantially homogeneous mix.

The preferred catalyst composition includes a major amount of explosive grade aluminum powder, and minor amounts of titanium sponge and zirconium hydride. An especially preferred catalyst composition contains about 90% by weight explosive grade aluminum power having a particle size of about 600 mesh, about 5% by weight titanium sponge having a particle size of about 325 mesh, and about 5% by weight zirconium hydride having a particle size of about 200 mesh.

As mentioned above, the binary exploding target package 10 of the present invention includes the target container 20 which preferably contains the oxidizer composition, the second container 30 which preferably contains the catalyst composition, an empty mixing container 40 and a funnel 50 which are shipped and stored together in suitable packaging. Since the oxidizer composition and catalyst composition are sealed in separate containers, the product is not subject to hazardous or explosive materials shipping or storage laws. In addition, the need for steel storage magazines, as required for shooting ranges which use premixed bullet sensitive explosives as targets, is also eliminated.

Mixing container 40 includes a mixing bottle 42 and a stopper 44, both preferably made of polyethylene. Funnel 50 is also preferably made of polyethylene.

When it is desired to form an exploding target from the binary exploding target package 10 of the present invention, the oxidizer composition contained in target container 20 and the catalyst composition contained in the catalyst container 30 are poured into mixing bottle 42 using funnel 50. Stopper 44 is then secured in place on mixing bottle 42 and the contents shaken to produce a substantially homogeneous mixture of oxidizer and catalyst. After mixing, the contents of mixing bottle 42 are emptied into target container bottle 22 using funnel 50, and target container lid 24 secured to target container bottle 22.

The steps of mixing the oxidizer and catalyst compositions, and the introduction of the oxidizer/catalyst mixture into target container bottle 22, are carried out just prior to use of the target container 20 as an exploding target and within a time frame that avoids violation of federal explosive shipping and storage laws.

A preferred exploding target is one that contains about 0.5 pound of oxidizer/catalyst composition. Although larger or smaller amounts may be used, larger amounts may cause a larger than safe detonation, and smaller amounts may not provide the marksman with the optimal blast showing that the target has been hit.

Whatever quantities are used, it is preferred that the weight ratio of oxidizer to catalyst is about 8:1 to ensure substantially complete detonation of all ingredients.

Even after the catalyst composition is added to the oxidizer composition, the resulting explosive composition contained in the exploding target of the present invention is safe as it is not flammable and cannot be detonated by friction.

The exploding target of the present invention requires high impulse energy to detonate its explosive composition. In fact, it requires the hydrostatic shock generated by a center fire rifle round to detonate it. A rim fire rifle round will not detonate the exploding target of the present invention, which means it is extremely unlikely to be detonated by accidental impact.

It will be obvious to those having skill in the art that many changes may be made to the details of the above-described embodiments of this invention without departing from the underlying principles thereof. The scope of the present invention should, therefore, be determined only by the following claims.

The invention claimed is:

[1. A binary exploding target package, said package including:

a first, target container and a second container;

one of said first and second containers containing an oxidizer composition, and the other of said first and second containers containing a catalyst composition;

said oxidizer composition including ammonium nitrate in an amount between about 50% and 100% by weight, and ammonium perchlorate in an amount between 0% and about 50% by weight;

said catalyst composition including aluminum powder and minor amounts of titanium sponge and zirconium hydride;

said target container being sized to receive a mixture comprised of all of said oxidizer composition and all of said catalyst composition.]

[2. The binary exploding target package of claim 1 wherein said target container has an outer surface that includes a target fixed thereon.]

[3. The binary exploding target package of claim 1 wherein said target container is formed of a material which shatters into very small pieces of a non-injurious size upon detonation.]

[4. The binary exploding target package of claim 3 wherein said target container is formed of polyethylene.]

[5. The binary exploding target package of claim 1 wherein said oxidizer composition includes about 85% by weight ammonium nitrate and about 15% by weight ammonium perchlorate.]

[6. The binary exploding target package of claim 1 wherein said catalyst composition includes about 90% by weight aluminum powder, about 5% by weight titanium sponge, and about 5% by weight zirconium hydride.]

[7. The binary exploding target package of claim 6 wherein said aluminum powder is explosive grade aluminum powder having a particle size of about 500 mesh.]

[8. The binary exploding target package of claim 6 wherein said titanium sponge has a particle size of about 325 mesh.]

[9. The binary exploding target package of claim 6 wherein said zirconium hydride has a particle size of about 200 mesh.]

[10. The binary exploding target package of claim 1 wherein the weight ratio of said oxidizer composition to said catalyst composition is about 8:1.]

[11. A binary exploding target comprising:

a target container containing an oxidizer composition, said oxidizer composition including ammonium nitrate in an amount between about 50% and 100% by weight and ammonium perchlorate in an amount between 0% and about 50% by weight; and a catalyst composition, said catalyst composition including aluminum powder and minor amounts of titanium sponge and zirconium hydride.]

[12. The binary exploding target of claim 11 wherein said target container has an outer surface that includes a target fixed thereon.]

[13. The binary exploding target of claim 11 wherein said target container is formed of a material which shatters into very small pieces of a non-injurious size upon detonation.]

[14. The binary exploding target of claim 13 wherein said target container is formed of polyethylene.]

15. [The] *A* process of [forming an] exploding *a* target *upon contact with a hydrostatic shock from a rifle round equivalent to that generated by a center fire rifle round impacting said target, said process* comprising:

selecting a first, target container and a second container;

storing an oxidizer composition within one of said first and second containers and a catalyst composition within the other container;

said oxidizer composition including ammonium nitrate in an amount between about 50% and 100% by weight and ammonium perchlorate in an amount between 0% and about 50% by weight;

said catalyst composition including aluminum powder and minor amounts of titanium sponge and zirconium hydride;

transporting said first and second containers to a location to be used for a shooting exercise;

mixing said oxidizer composition and said catalyst composition together to form an oxidizer/catalyst *mixture, said target container containing said mixture adapted to explode upon being subjected to the hydrostatic shock from the rifle round equivalent to that generated by the center fire rifle round impacting said* mixture; and introducing said oxidizer/catalyst mixture into said target container to form [an exploding] *the* target,

*wherein said target is the target container containing the oxidizer/catalyst mixture,*

*firing a center fire rifle round into the target thereby causing an explosion of the oxidizer/catalyst mixture.*

16. The process of claim 15 wherein said oxidizer composition includes about 85% by weight ammonium nitrate and about 15% by weight ammonium perchlorate.

17. The process of claim 15 wherein said catalyst composition includes about 90% by weight aluminum powder, about 5% by weight titanium sponge, and about 5% by weight zirconium hydride.

18. The process of claim 15 wherein said aluminum powder is explosive grade aluminum powder having a particle size of about 500 mesh.

19. The process of claim 15 wherein said titanium sponge has a particle size of about 325 mesh.

20. The process of claim 15 wherein said zirconium hydride has a particle size of about 200 mesh.

21. The process of claim 15 wherein the weight ratio of said oxidizer composition to said catalyst composition is about 8:1.

22. The process of claim 15 wherein said target container includes a target area fixed on the outer surface thereof.

*23. A process of exploding a target upon contact with a hydrostatic shock from a rifle round equivalent to that generated by a center fire rifle round impacting said target, said process comprising:*

*selecting a first container and a second container;*

*storing an oxidizer composition within one of said first and second containers and a catalyst composition within the other container;*

*transporting said first and second containers to a location to be used for a shooting exercise;*

*mixing said oxidizer composition and said catalyst composition together to form an oxidizer/catalyst mixture; and*

*introducing said oxidizer/catalyst mixture into a target container to form the target adapted to explode upon being subjected to the hydrostatic shock from the rifle round equivalent to that generated by the center fire rifle round impacting said target,*

*wherein said target is the target container containing the oxidizer/catalyst mixture, firing a center fire rifle round into the target thereby causing an explosion of the oxidizer/catalyst mixture.*

*24. The process of claim 23 wherein one of said first and second containers is said target container.*

*25. A process of exploding a target upon contact with a hydrostatic shock from a rifle round equivalent to that generated by a center fire rifle round impacting said target, said process comprising:*

*selecting a first, target container and a second container;*

*storing an oxidizer composition within one of said first and second containers and a catalyst composition within the other container;*

*transporting said first and second containers to a location to be used for a shooting exercise;*

*mixing said oxidizer composition and said catalyst composition together to form an oxidizer/catalyst mixture; and*

*introducing said oxidizer/catalyst mixture into said target container to form said target adapted to explode upon being subjected to the hydrostatic shock from the rifle round equivalent to that generated by the center fire rifle round impacting said target,*

*wherein said target is the target container containing the oxidizer/catalyst mixture, firing a center fire rifle round into the target thereby causing an explosion of the oxidizer/catalyst mixture.*

*26. The process of claim 23 wherein said oxidizer composition includes ammonium nitrate.*

*27. The process of claim 25, wherein said oxidizer composition includes ammonium nitrate.*

*28. The process of claim 26 wherein said catalyst composition includes aluminum powder.*

*29. The process of claim 27 wherein said catalyst composition includes aluminum powder.*

*30. The process of claim 23 wherein said catalyst composition includes aluminum powder.*

*31. The process of claim 25 wherein said catalyst composition includes aluminum powder.*

*32. The process of claim 23 wherein said catalyst composition includes aluminum powder which is explosive grade aluminum powder having a particle size of about 500 mesh.*

*33. The process of claim 25 wherein said catalyst composition includes aluminum powder which is explosive grade aluminum powder having a particle size of about 500 mesh.*

*34. The process of claim 23 wherein the weight ratio of said oxidizer composition to said catalyst composition is about 8:1.*

*35. The process of claim 25 wherein the weight ratio of said oxidizer composition to said catalyst composition is about 8:1.*

*36. The process of claim 23 wherein said target container includes a target area fixed on the outer surface thereof.*

*37. The process of claim 25 wherein said target container includes a target area fixed on the outer surface thereof.*

*38. The process of claim 23 wherein said target container is formed of polyethylene.*

*39. The process of claim 25 wherein said target container is formed of polyethylene.*

*40. The process of claim 23 wherein said oxidizer composition includes ammonium nitrate in an amount between about 50% and 100% by weight and ammonium perchlorate in an amount between 0% and about 50% by weight.*

*41. The process of claim 25 wherein said oxidizer composition includes ammonium nitrate in an amount between about 50% and 100% by weight and ammonium perchlorate in an amount between 0% and about 50% by weight.*

* * * * *

UNITED STATES PATENT AND TRADEMARK OFFICE

CERTIFICATE OF CORRECTION

PATENT NO. : RE44,386 E
APPLICATION NO. : 11/206283
DATED : July 23, 2013
INVENTOR(S) : Tanner It is certified that error appears in the above-identified patent and that said Letters Patent is hereby corrected as shown below:

On the title page item [63], titled "U.S. Applications" is replaced with:

--"(63) Continuation-in-part of application No. 09/872,187, filed on June 4, 2001, now abandoned.--

In the specification

Column 1, lines 13-14 are replaced with:

--[This is a continuation-in-part of application Ser. No. 09/872,187 filed Aug. 20, 2001.] A reissue application has been filed for the reissue of U.S. Pat. No. 6,848,366. The reissue application is 11/206,283 (the present application), which is a continuation reissue of U.S. Pat. No. 6,848,366. U.S. Reissue application Ser. No. 11/206,283 filed on Aug. 16, 2005 is a reissue of U.S. Pat. No. 6,848,366 which issued on Feb. 1, 2005; and U.S. Pat. No. 6,848,366 was filed as U.S. application Ser. No. 10/274,464 on Oct. 17, 2002, which is a Continuation-in-part of U.S. application Ser. No. 09/872,187, filed on June 4, 2001. The entire contents of all of the above-applications is hereby incorporated by reference.--

Signed and Sealed this
Third Day of November, 2015

Michelle K. Lee

Michelle K. Lee
*Director of the United States Patent and Trademark Office*

UNITED STATES PATENT AND TRADEMARK OFFICE

CERTIFICATE OF CORRECTION

PATENT NO. : RE44,386 E
APPLICATION NO. : 11/206283
DATED : July 23, 2013
INVENTOR(S) : Tanner It is certified that error appears in the above-identified patent and that said Letters Patent is hereby corrected as shown below:

This certificate supersedes the Certificate of Correction issued on November 3, 2015. The certificate which issued on November 3, 2015 is vacated since the parent application (09/872,187) indicated that a filing date would not be provided until receipt of a new specification, which was 8/20/01. Petition to correct the filing date in application is required for filing date to be changed in Related U.S. Related Applications and Cross-Reference to Related Applications. The Certificate of Correction which issued on November 3, 2015 was published in error and should not have been issued for this patent.

The patent is returned to its original state as follows:

Title Page, Item (63) Related U.S. Applications should read

-- (63) Continuation-in-part of application No. 09/872,187, filed on Aug. 20, 2001, now abandoned. --.

Column 1, lines 13-14 should read

-- This is a continuation-in-part of application Ser. No. 09/872,187 filed Aug. 20, 2001 *now abandoned.* --.

Signed and Sealed this
Twenty-ninth Day of December, 2015

Michelle K. Lee

Michelle K. Lee
*Director of the United States Patent and Trademark Office*